US012317951B2

(12) United States Patent
Chen et al.

(10) Patent No.: US 12,317,951 B2
(45) Date of Patent: Jun. 3, 2025

(54) SOLE STRUCTURE FOR ARTICLE OF FOOTWEAR

(71) Applicant: NIKE, Inc., Beaverton, OR (US)

(72) Inventors: Yuchung K. Chen, Portland, OR (US); Dolores S. Thompson, Beaverton, OR (US); Nikita A. Troufanov, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 17/133,823

(22) Filed: Dec. 24, 2020

(65) Prior Publication Data

US 2021/0204651 A1 Jul. 8, 2021

Related U.S. Application Data

(60) Provisional application No. 62/956,976, filed on Jan. 3, 2020.

(51) Int. Cl.
*A43B 13/18* (2006.01)
*A43B 13/04* (2006.01)
(Continued)

(52) U.S. Cl.
CPC ............ *A43B 13/188* (2013.01); *A43B 13/04* (2013.01); *A43B 13/16* (2013.01); *A43B 13/37* (2013.01)

(58) Field of Classification Search
CPC ....... A43B 13/16; A43B 13/12; A43B 13/188; A43B 13/37; A43B 13/127; A43B 13/41; A43B 3/16; A43B 17/006; A43B 13/125
See application file for complete search history.

(56) References Cited

U.S. PATENT DOCUMENTS 1,289,711 A * 12/1918 Ettle ...................... A43B 13/12
36/31
3,121,962 A * 2/1964 Gullo .................. A43B 13/141
36/11.5
(Continued)

FOREIGN PATENT DOCUMENTS

CN 101795592 A 8/2010
KR 100941367 B1 2/2010
(Continued)

OTHER PUBLICATIONS

International Search Report issued in International Application No. PCT/US2020/067150 dated Mar. 25, 2021 (3 pages).
(Continued)

*Primary Examiner* — Sharon M Prange
*Assistant Examiner* — Grady Alexander Nunnery
(74) *Attorney, Agent, or Firm* — Bookoff McAndrews, PLLC (57) ABSTRACT

A sole structure for an article of footwear includes an interior cushioning arrangement extending from an anterior end to a posterior end. The sole structure also includes a forefoot cushioning element extending from the anterior end to a first end and including a first material having a first durometer. The sole structure further includes a heel cushioning element extending from the posterior end to a second end and including a second material having a second durometer. The first end of the forefoot cushioning element and the second end of the heel cushioning element overlap one another.

17 Claims, 9 Drawing Sheets

(51) Int. Cl.
  *A43B 13/16* (2006.01)
  *A43B 13/37* (2006.01)

(56) References Cited

U.S. PATENT DOCUMENTS

| | | | | |
|---|---|---|---|---|
| 4,003,146 A * | 1/1977 | Meier | ............... | A43B 7/145 36/44 |
| 4,481,727 A * | 11/1984 | Stubblefield | ............. | A43B 5/00 36/83 |
| 4,510,702 A | 4/1985 | Ehrlich, Jr. | | |
| 4,760,655 A * | 8/1988 | Mauch | ............... | A43B 7/146 36/43 |
| 4,823,483 A * | 4/1989 | Chapnick | ............... | A43B 17/14 36/43 |
| 4,843,741 A * | 7/1989 | Yung-Mao | ............ | A43B 13/184 36/114 |
| 4,924,606 A * | 5/1990 | Montgomery | ............ | A43B 3/30 36/102 |
| 4,930,232 A * | 6/1990 | Engle | ............... | A43B 17/14 36/71 |
| 5,187,883 A * | 2/1993 | Penney | ............... | A43B 21/26 36/35 R |
| 5,784,811 A * | 7/1998 | Mauch | ............... | A43B 7/1425 36/43 |
| 5,842,294 A * | 12/1998 | Fabricant | ............... | A43B 7/142 36/173 |
| 5,899,006 A * | 5/1999 | Donnadieu | ............ | A43B 5/0492 36/31 |
| 5,979,083 A * | 11/1999 | Robinson | ............ | A43B 1/0072 36/102 |
| 6,000,148 A * | 12/1999 | Cretinon | ............... | A43B 5/002 36/88 |
| 8,166,672 B2 | 5/2012 | Murphy et al. | | |
| 2003/0172548 A1 * | 9/2003 | Fuerst | ............... | A43B 13/026 36/28 |
| 2003/0200678 A1 * | 10/2003 | Nishiwaki | ............ | A43B 13/16 36/28 |
| 2005/0034326 A1 * | 2/2005 | Wang | ............... | A43B 13/026 36/23 |
| 2007/0113424 A1 * | 5/2007 | Bell | ............... | A43B 13/122 36/7.6 |
| 2010/0299969 A1 * | 12/2010 | Paez | ............... | A43B 13/16 36/43 |
| 2011/0078922 A1 * | 4/2011 | Cavaliere | ............... | B29D 35/10 36/77 R |
| 2011/0162232 A1 * | 7/2011 | Gazzara | ............... | A43B 13/12 36/28 |
| 2011/0179669 A1 * | 7/2011 | Hanebrink | ............ | A43B 7/144 36/28 |
| 2011/0225852 A1 * | 9/2011 | Mahoney | ............ | A43B 13/148 36/30 R |
| 2013/0019497 A1 * | 1/2013 | Sullivan | ............... | A43B 7/144 36/28 |
| 2013/0081305 A1 * | 4/2013 | Byrne | ............... | A43B 13/181 36/31 |
| 2015/0082668 A1 * | 3/2015 | Nonogawa | ............ | A43B 13/14 36/30 R |
| 2016/0302517 A1 * | 10/2016 | Jessiman | ............ | A43B 13/187 |
| 2017/0151742 A1 * | 6/2017 | Hartmann | ............ | A43B 7/1425 |
| 2017/0303633 A1 * | 10/2017 | Hopkins | ............ | A43B 13/223 |
| 2017/0340053 A1 * | 11/2017 | Madore | ............ | A43B 13/223 |
| 2018/0199666 A1 * | 7/2018 | Moriyasu | ............ | A43B 23/028 |
| 2019/0297991 A1 * | 10/2019 | Bongers | ............ | A43B 23/042 |
| 2020/0022451 A1 * | 1/2020 | Smith | ............... | A43B 13/127 |

FOREIGN PATENT DOCUMENTS

| | | |
|---|---|---|
| TW | 201711586 A | 4/2017 |
| WO | 2014178739 A2 | 11/2014 |

OTHER PUBLICATIONS

Taiwanese Office Action issued in Taiwanese Application No. 109147022 dated Nov. 9, 2021 (15 pages).

* cited by examiner

SOLE STRUCTURE FOR ARTICLE OF FOOTWEAR

CROSS REFERENCE TO RELATED APPLICATION

This application claims priority to U.S. Provisional Application No. 62/956,976, filed Jan. 3, 2020, the contents of which are hereby incorporated by reference in their entirety.

FIELD

The present disclosure relates generally to sole structures for articles of footwear, and more particularly, to sole structures having a composite structure.

BACKGROUND

This section provides background information related to the present disclosure which is not necessarily prior art.

Articles of footwear conventionally include an upper and a sole structure. The upper may be formed from any suitable material(s) to receive, secure, and support a foot on the sole structure. The upper may cooperate with laces, straps, or other fasteners to adjust the fit of the upper around the foot. A bottom portion of the upper, proximate to a bottom surface of the foot, attaches to the sole structure.

Sole structures generally include a layered arrangement extending between a ground surface and the upper. One layer of the sole structure includes an outsole that provides abrasion-resistance and traction with the ground surface. The outsole may be formed from rubber or other materials that impart durability and wear-resistance, as well as enhance traction with the ground surface. Another layer of the sole structure includes a midsole disposed between the outsole and the upper. The midsole provides cushioning for the foot and may be partially formed from a polymer foam material that compresses resiliently under an applied load to cushion the foot by attenuating ground-reaction forces. The midsole may additionally or alternatively incorporate a fluid-filled bladder to increase durability of the sole structure, as well as to provide cushioning to the foot by compressing resiliently under an applied load to attenuate ground-reaction forces. Sole structures may also include a comfort-enhancing insole or a sockliner located within a void proximate to the bottom portion of the upper and a strobel attached to the upper and disposed between the midsole and the insole or sockliner.

DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

One aspect of the disclosure provides a sole structure for an article of footwear. The sole structure includes an interior cushioning arrangement extending from an anterior end to a posterior end. The sole structure also includes a forefoot cushioning element extending from the anterior end to a first end and including a first material having a first durometer. The sole structure further includes a heel cushioning element extending from the posterior end to a second end and including a second material having a second durometer, the first end of the forefoot cushioning element and the second end of the heel cushioning element overlapping one another.

Implementations of the disclosure may include one or more of the following optional features. In some implementations, the second durometer is less than the first durometer. The interior cushioning arrangement may include a first surface having a first portion formed by the forefoot cushioning element and a second portion formed by the heel cushioning element. A plate may be disposed adjacent to the first surface of the interior cushioning arrangement. Here, the plate may be disposed within a socket formed in the first surface of the interior cushioning arrangement. Optionally, an upper cushioning element may be disposed on an opposite side of the plate than the interior cushioning arrangement and may include a third material having a third durometer. Here, the third durometer may be greater than the first durometer and the second durometer.

In some examples, the sole structure includes an outer shell formed of a fourth material and defining a receptacle, the interior cushioning arrangement at least partially received within the receptacle. The first material may be a first foamed elastomer and the second material may be a second foamed elastomer. The first end may include a first beveled surface and the second end may have a second beveled surface, the first beveled surface mating with the second beveled surface.

Another aspect of the disclosure provides a sole structure for an article of footwear. The sole structure includes a forefoot cushioning element extending from a first distal end to a first proximal end and including a first material having a first durometer. The first proximal end includes a first beveled engagement surface. The sole structure also includes a heel cushioning element extending from a second distal end to a second proximal end and including a second material having a second durometer. The second proximal end includes a second beveled engagement surface opposing the first beveled engagement surface of the forefoot cushioning element.

This aspect may include one or more of the following optional features. In some configurations, the second durometer is less than the first durometer. The forefoot cushioning element and the heel cushioning element may cooperate to form a first surface having a first portion formed by the forefoot cushioning element and a second portion formed by the heel cushioning element. A plate may be disposed adjacent to the first surface. Here, the plate may be disposed within a socket formed in the first surface. An upper cushioning element may be disposed on an opposite side of the plate than the forefoot cushioning element and the heel cushioning element, and may include a third material having a third durometer. The third durometer may be greater than the first durometer and the second durometer.

In some implementations, the sole structure includes an outer shell formed of a fourth material and defining a receptacle, the forefoot cushioning element and the heel cushioning element at least partially received within the receptacle. The first material may be a first foamed elastomer and the second material may be a second foamed elastomer. The first engagement surface may include a first plurality of engagement features and the second engagement surface may include a second plurality of engagement features configured to mate with the first engagement features.

The details of one or more implementations of the disclosure are set forth in the accompanying drawings and the description below. Other aspects, features, and advantages will be apparent from the description and drawings, and from the claims.

Figure 1:
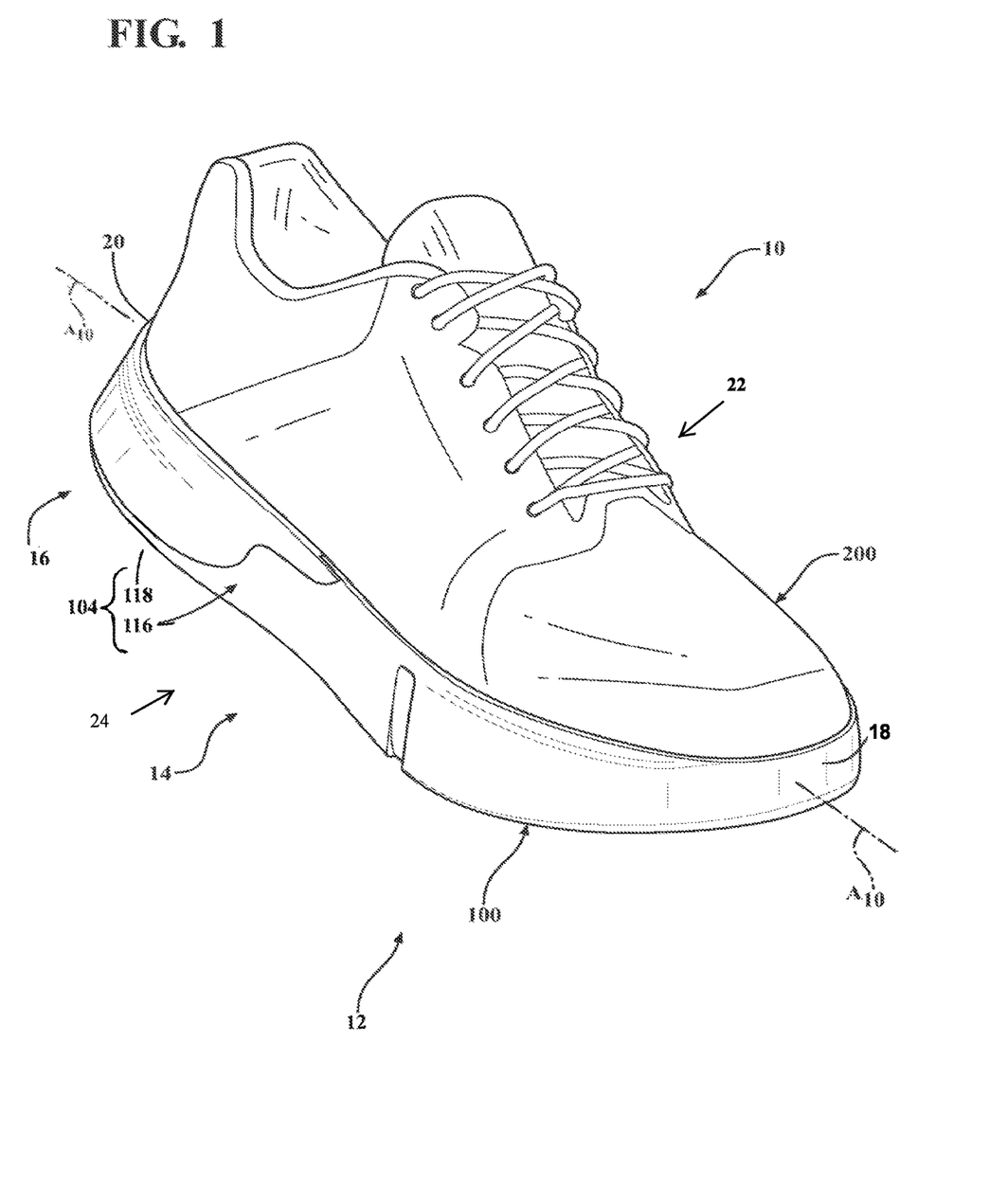
FIG. 1 is a perspective view of an article of footwear including a sole structure in accordance with principles of the present disclosure.
Figure 7:
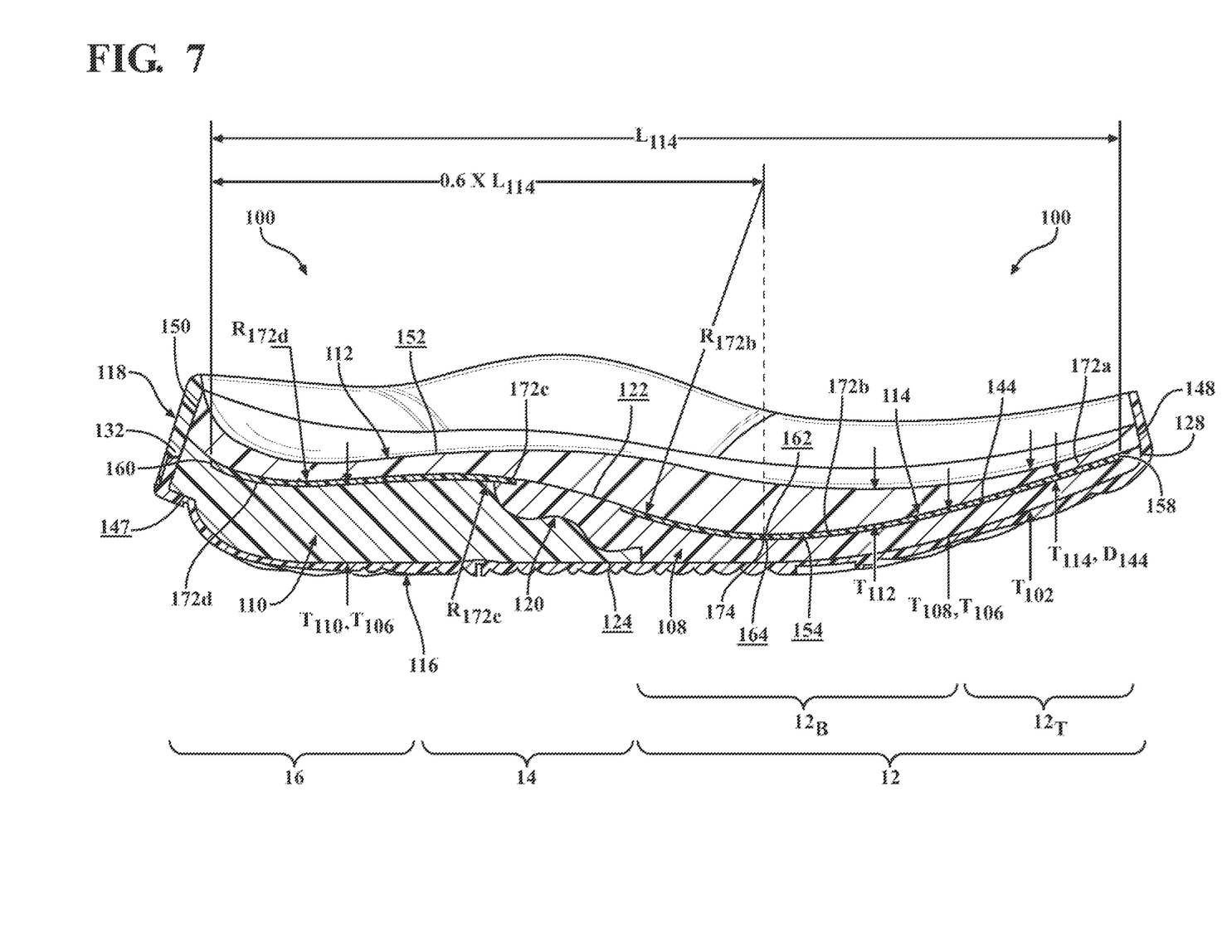
FIG. 7 is a cross-sectional view of the sole structure of FIG. 6, taken along Line 7-7 of FIG. 6.
Figure 8:
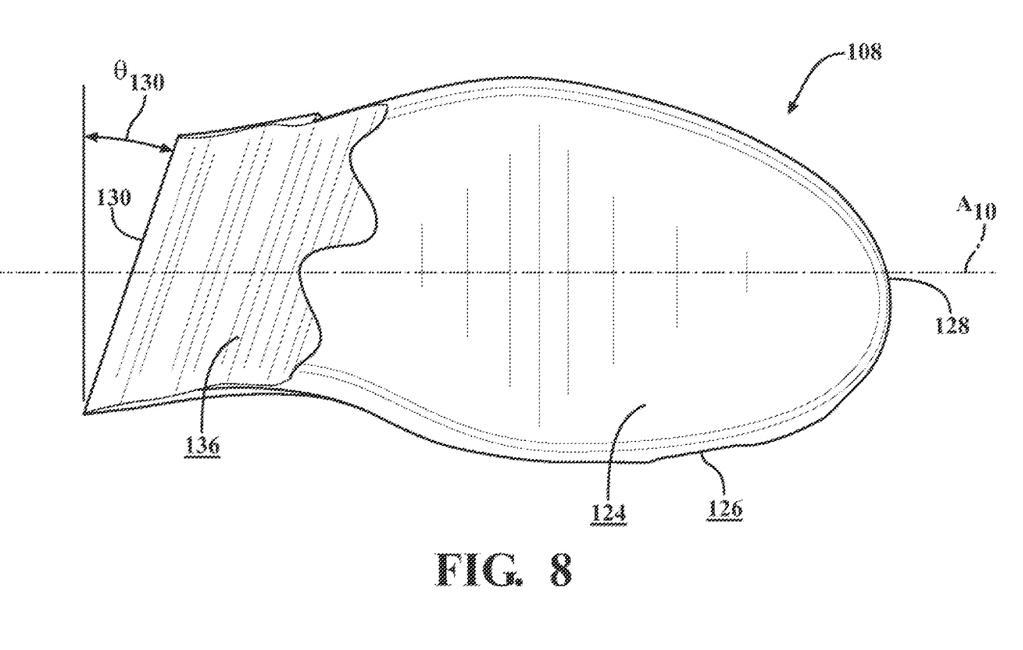
FIG. 8 is a bottom plan view of a forefoot cushioning element in accordance with the principles of the present disclosure, for use with the sole structure of FIG. 6.

Referring to FIG. 1, an article of footwear 10 includes a sole structure 100 and an upper 200 attached to the sole structure 100. The article of footwear 10, the sole structure 100, and the upper 200 may be divided into one or more regions. The regions may include a forefoot region 12, a mid-foot region 14, and a heel region 16. As indicated in FIG. 7, the forefoot region 12 may be described as including a toe portion $12_T$ corresponding with the phalanges of the foot, and a ball portion $12_B$ corresponding to the metatarsophalangeal (MTP) joint of the foot. The mid-foot region 14 may correspond with an arch area of the foot, and the heel region 16 may correspond with rear portions of the foot, including a calcaneus bone. The footwear 10, the sole structure 100, and the upper 200 may further include an anterior end 18 associated with a forward-most point of the forefoot region 12, and a posterior end 20 corresponding to a rearward-most point of the heel region 16. A longitudinal axis $A_{10}$ of the footwear 10 extends along a length of the footwear 10 from the anterior end 18 to the posterior end 20, and generally divides the footwear 10 into a medial side 22 and a lateral side 24, as shown in FIG. 1. Accordingly, the medial side 22 and the lateral side 24 respectively correspond with opposite sides of the footwear 10 and extend through the regions 12, 14, 16.

Figure 2:
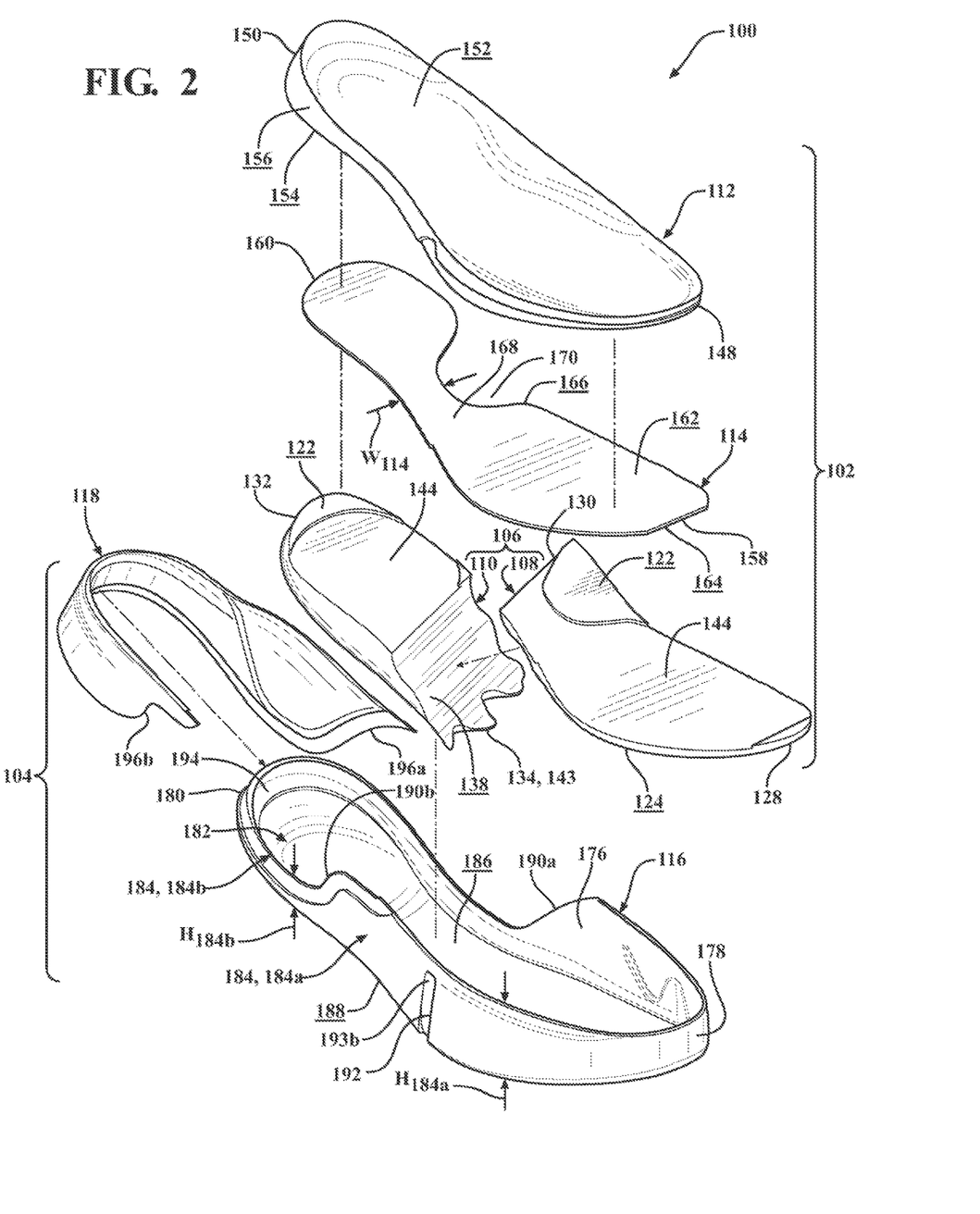
FIG. 2 is an exploded perspective view of a sole structure in accordance with the principles of the present disclosure, for use with the article of footwear of FIG. 1.

With reference to FIG. 2, the sole structure 100 includes a midsole 102 configured to provide cushioning and performance characteristics to the sole structure 100, and an outsole 104 configured to provide a ground-engaging surface of the article of footwear 10. Unlike conventional sole structures, the midsole 102 of the sole structure 100 may be formed compositely and include a plurality of subcomponents for providing desired forms of cushioning and support throughout the sole structure 100. For example, the midsole 102 includes an interior cushioning arrangement 106 having a forefoot cushioning element 108 and a heel cushioning element 110, an upper cushioning element 112 disposed on a top side of the interior cushioning arrangement 106, and a plate 114 disposed between the interior cushioning arrangement 106 and the upper cushioning element 112. Similarly, the outsole 104 includes an outer shell 116 configured to receive a portion of the midsole 102 therein, and a heel counter 118 disposed at the posterior end 20.

Figure 3:
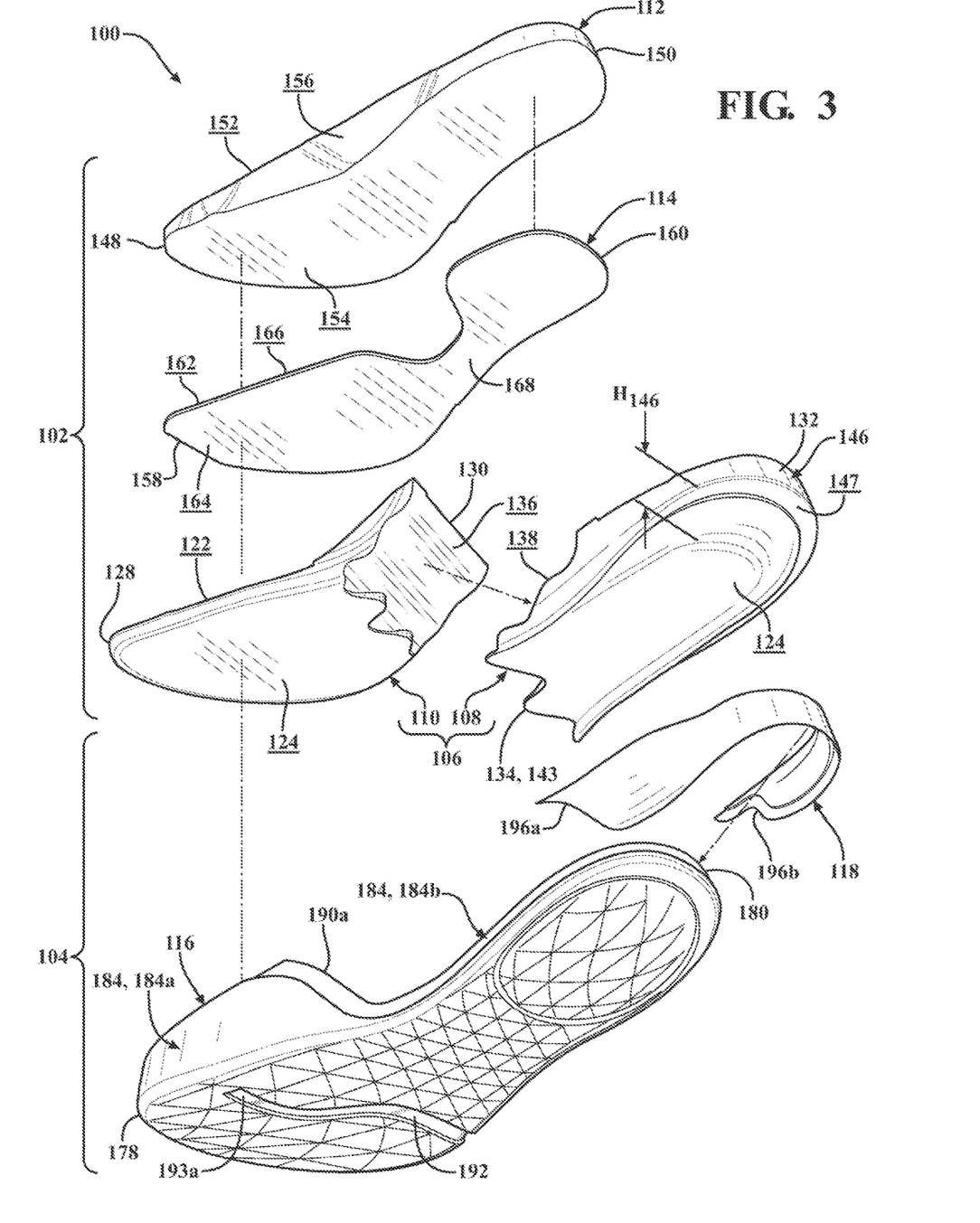
FIG. 3 is a partially exploded perspective view of a sole structure in accordance with the principles of the present disclosure, for use with the article of footwear of FIG. 1.
Figure 4:
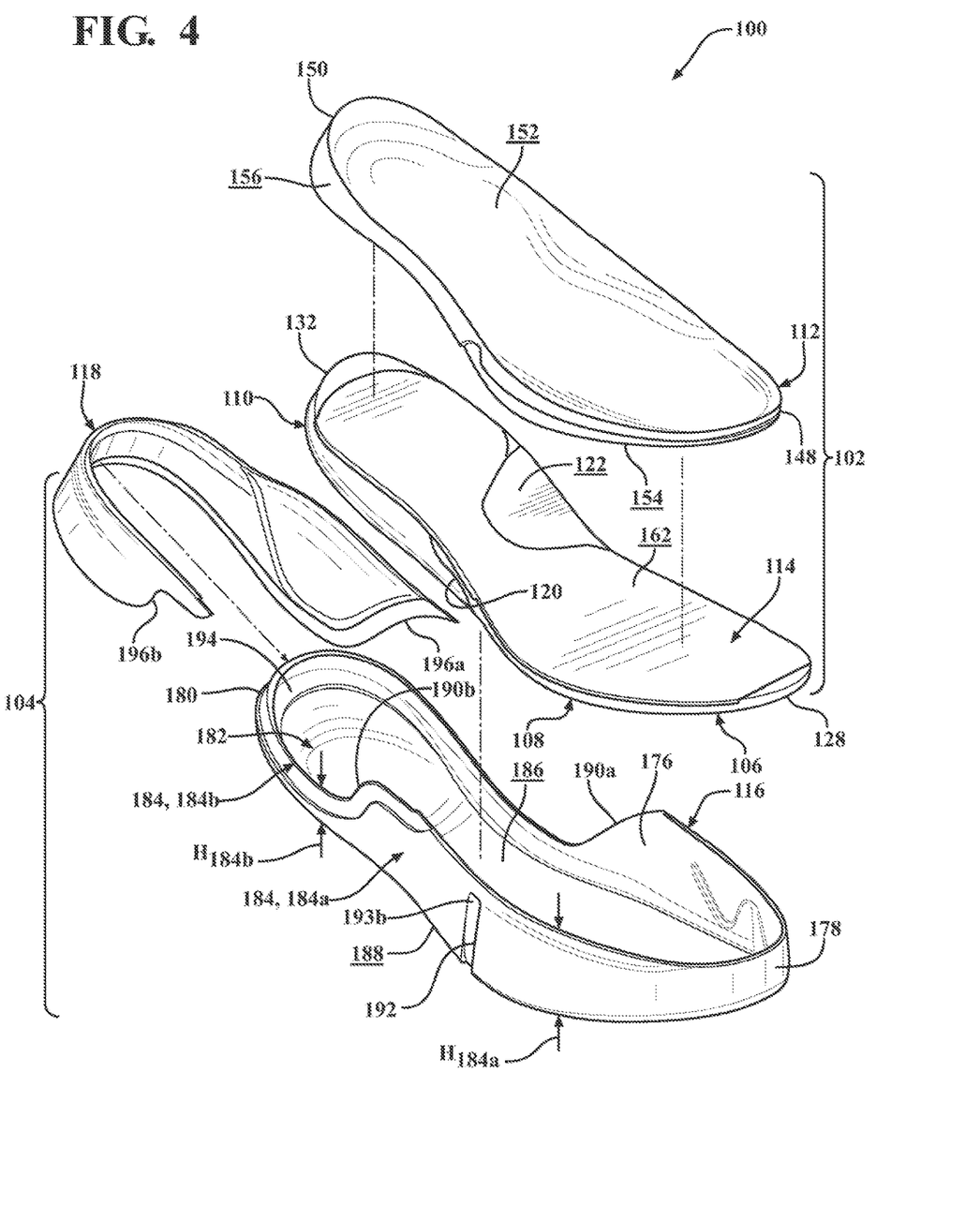
FIG. 4 is a partially exploded perspective view of a sole structure in accordance with the principles of the present disclosure, for use with the article of footwear of FIG. 1.

With reference to FIGS. 2-4, the interior cushioning arrangement 106 is itself formed as a composite structure including the forefoot cushioning element 108 and the heel cushioning element 110. In the illustrated example, opposing ends (i.e., facing each other) of the forefoot cushioning element 108 and the heel cushioning element 110 interface with each other along a central joint 120 (FIG. 7) to form a substantially continuous body including the forefoot cushioning element 108 and the heel cushioning element 110. The forefoot cushioning element 108 may be formed of a different material than the heel cushioning element 110 to provide the interior cushioning arrangement 106 with different cushioning properties in the different regions 12, 14, 16. For example, the heel cushioning element 110 may be formed of a material having a lower durometer than the forefoot cushioning element 108 to provide the heel region 16 with a softer feel than the forefoot region 12. Accordingly, the heel cushioning element 110 will provide greater impact attenuation than the forefoot cushioning element 108.

The interior cushioning arrangement 106 includes a top surface 122 formed on a first side, a bottom surface 124 formed on an opposite side than the top surface 122, and a peripheral side surface 126 extending between the top surface 122 and the bottom surface 124. A distance from the top surface 122 to the bottom surface 124 defines a thickness of the interior cushioning arrangement 106. As shown, when the interior cushioning arrangement 106 is assembled, the forefoot cushioning element 108 and the heel cushioning element 110 cooperate with each other to define each of the top surface 122, the bottom surface 124, and the peripheral side surface 126. In other words, the forefoot cushioning element 108 includes respective first portions of each of the top surface 122, the bottom surface 124, and the peripheral side surface 126, and the heel cushioning element 110 includes respective second portions of each of the top surface 122, the bottom surface 124, and the peripheral side surface 126. Accordingly, features of the entire interior cushioning arrangement 106 or either of the forefoot cushioning element 108 or the heel cushioning element 110 may be described in terms of one or more of the surfaces 122, 124, 126.

Referring again to FIGS. 2-4, the forefoot cushioning element 108 extends along the longitudinal axis $A_{10}$ from a first distal end 128 facing the anterior end 18 of the article of footwear 10, to a first proximal end 130 facing the posterior end 20 of the article of footwear 10. The heel cushioning element 110 extends along the longitudinal axis $A_{10}$ from a second distal end 132 facing the posterior end 20 of the article of footwear 10, to a second proximal end 134 facing the anterior end 18 of the article of footwear 10. Accordingly, when the interior cushioning arrangement 106 is assembled, the distal ends 128, 132 of the respective cushioning elements 108, 110 form opposite terminal ends 128, 132 of the interior cushioning arrangement 106, while the proximal ends 130, 134 cooperate to form the central joint 120 of the interior cushioning arrangement 106.

Figure 9:
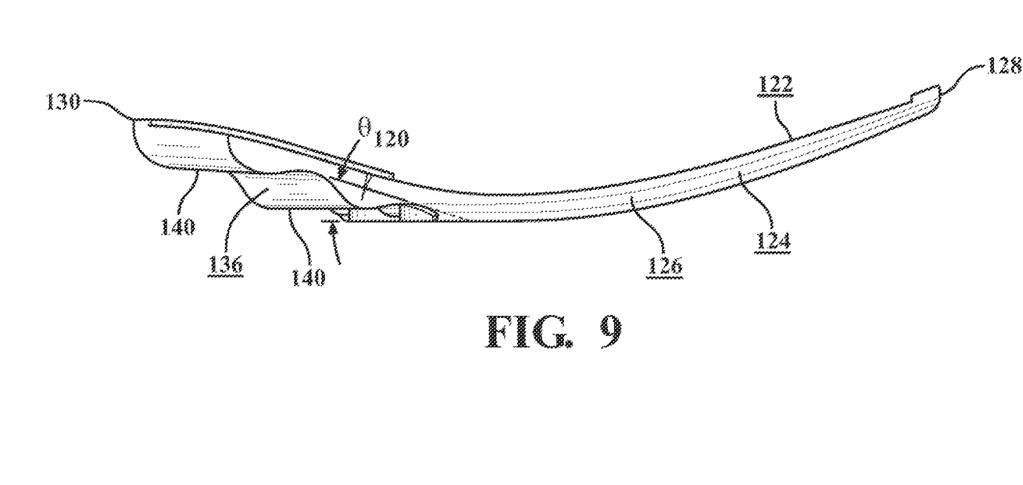
FIG. 9 is a side elevation view of the forefoot cushioning element of FIG. 8.
Figure 10:
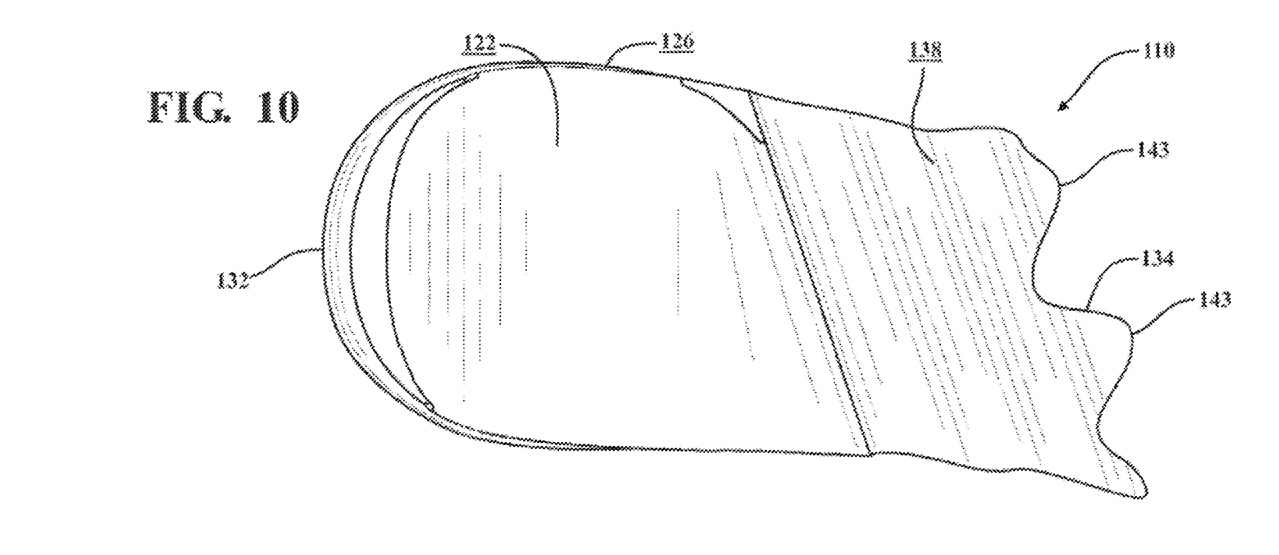
FIG. 10 is a top plan view of a heel cushioning element in accordance with the principles of the present disclosure, for use with the sole structure of FIG. 6.
Figure 11:
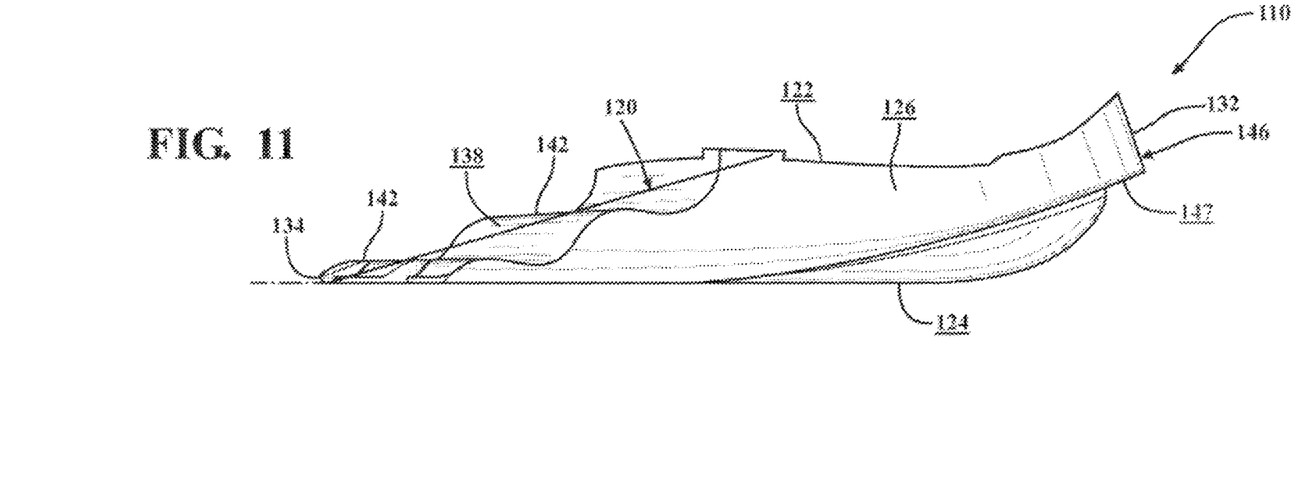
FIG. 11 is a side elevation view of the forefoot cushioning element of FIG. 10.

As best shown in FIG. 7, the first proximal end 130 and the second proximal end 134 include complementary or cooperating engagement surfaces 136, 138, which are configured to interface with each other to form a substantially uninterrupted interior cushioning arrangement 106. Here, each of the proximal ends 130, 134 includes a respective beveled engagement surface 136, 138 extending between the top surface 122 and the bottom surface 124 of the interior cushioning arrangement 106, such that at least a portion of one of the engagement surfaces 136, 138 overlaps with at least a portion of the other one of the engagement surfaces 136, 138. In some examples, each of the engagement surfaces 136, 138 is formed as a bevel extending continuously and completely from the top surface 122 to the bottom surface 124, such that the entire first engagement surface 136 of the forefoot cushioning element 108 overlaps or is overlapped by the entire second engagement surface 138 of the heel cushioning element 110. For example, as shown in FIG. 9, the first engagement surface 136 extends rearward (i.e., toward the posterior end 20) from the bottom surface 124 at a first angle $\theta_{120}$ such that the thickness of the forefoot cushioning element 108 tapers towards the top surface 122 and the first proximal end 130. Conversely, as shown in FIG. 11, the second proximal end 134 extends forward from the top surface 122 at a second angle $\theta_{120}$ such that the thickness of the heel cushioning element 110 tapers towards the bottom surface 124 and the second proximal end 134.

With reference to FIGS. 8-11, the engagement surfaces 136, 138 of each of the cushioning elements 108, 110 include respective engagement features 140, 142 configured to interface with each other to provide the central joint 120 with increased integrity. Generally, first engagement features 140 of the forefoot cushioning element 108 are configured to interface or mate with corresponding second engagement features 142 of the heel cushioning element 110 to secure a relative position of the forefoot cushioning element 108 and the heel cushioning element 110. In the illustrated example, the engagement features 140, 142 of each of the engagement surfaces 136, 138 include respective pluralities of steps 140, 142 arranged in series from the top surface 122 to the bottom surface 124. Here, the steps 140 of the first engagement surface 136 are configured to mate with the steps 142 of the second engagement surface 138. As shown, the steps 140, 142 may be formed as undulations, whereby edges of the steps 140, 142 are radiused to form complementary concave and convex surfaces extending across a width of the interior cushioning arrangement 106. In one configuration, the convex portions of the first engagement surface 136 may be matingly received by the concave portions of the second engagement surface 138, and the concave portions of the first engagement surface 136 may matingly receive the convex portions of the second engagement surface 138 (FIG. 7). In so doing, a good connection between the surfaces 136, 138 is achieved by (i) creating a mating connection between the surfaces 136, 138 and (ii) increasing the contact area between the surfaces 136, 138 (as compared to flat, opposing surfaces). Additionally or alternatively, the proximal end 130, 134 of one or both of the cushioning elements 108, 110 may be formed with lateral engagement features 143 (e.g., projections, undulations) for interfacing with the other of the cushioning elements 108, 110.

Providing the beveled central joint 120 with the stepped or undulated engagement surfaces 136, 138 provides a secure transitional region along a central portion of the interior cushioning arrangement 106. Particularly, the beveled configuration provides a gradual transition from the first durometer of the forefoot cushioning element 108 to the second durometer of the heel cushioning element 110, which provides a desired underfoot feel. The stepped interface between the cushioning elements 108, 110 functions to secure a relative longitudinal position between the cushioning elements 108, 110, whereby the first proximal end 130 of the forefoot cushioning element 108 is prevented from creeping or sliding longitudinally along the second proximal end 134 of the heel cushioning element 110. Further providing one or both of the proximal ends 130, 134 with lateral engagement features 143 secures a relative lateral position between the forefoot cushioning element 108 and the heel cushioning element 110.

With continued reference to FIG. 2, the top surface 122 of the interior cushioning arrangement 106 includes a socket 144 configured for receiving at least a portion of the plate 114 therein when the sole structure 100 is assembled. In the illustrated example, a depth of the socket 144 corresponds to a thickness of the plate 114, such that when the sole structure 100 is assembled, a top surface of the plate 114 is flush with the top surface 122 of the interior cushioning arrangement 106. As shown, the socket 144 may extend continuously across a width of the interior cushioning arrangement 106 to intersect with the peripheral side surface 126 on the medial side 22 and the lateral side 24 in the forefoot region 12 and the heel region 16. Accordingly, when the sole structure 100 is assembled, an outer periphery of the plate 114 may be exposed through the peripheral side surface 126 on the medial side 22 and the lateral side 24.

Referring to FIGS. 3, 7, and 11, the interior cushioning arrangement 106 may include a flange 146 extending around the second distal end 132 of the heel cushioning element 110, from the medial side 22 to the lateral side 24. The flange 146 includes a planar, downward-facing surface 147 configured to rest upon a corresponding step 194 formed within the outsole 104, as discussed in greater detail below. As shown in FIGS. 3 and 11, a height $H_{146}$ of the flange 146, measured as a distance from the bottom surface 124 to the downward-facing surface 147, gradually increases along each of the medial and lateral sides 22, 24 to a maximum height at the second distal end 132.

The upper cushioning element 112 extends longitudinally from a first end 148 at the anterior end 18 to a second end 150 at the posterior end 20. The upper cushioning element 112 includes a top surface 152 configured to form a footbed of the sole structure 100, a bottom surface 154 formed on an opposite side of the upper cushioning element 112 than the top surface 152, and a peripheral side surface 156 extending from the top surface 152 to the bottom surface 154 and defining an outer periphery of the upper cushioning element 112. A distance from the top surface 152 to the bottom surface 154 defines a thickness T112 of the upper cushioning element 112.

The cushioning elements 112 are formed of a resilient polymeric material, such as foam or rubber, to impart properties of cushioning, responsiveness, and energy distribution to the foot of the wearer. In the illustrated example, the forefoot cushioning element 108 is formed of a first foam material, the heel cushioning element 110 is formed of a second foam material, and the upper cushioning element 112 is formed of a third foam material. For example, the forefoot cushioning element 108 may be formed of a first foamed material having a first durometer, the heel cushioning element 110 may be formed of a second foamed material having a second durometer that is less than the first durometer, and the upper cushioning element 112 may be formed of a third material having a third durometer that is higher than the first durometer and the second durometer. The cushioning elements 108, 110, 112 may be affixed to each other using a fusing process, using an adhesive, or by suspending the elements in a different resilient polymeric material. Alternatively, the plurality of elements may not be affixed to each other, but may remain independent. As discussed above, the cushioning elements 108, 110, 112 may be formed with cooperating geometries (e.g., steps, protrusions) for restricting relative motion between the cushioning elements 108, 110, 112.

Example resilient polymeric materials for the cushioning elements 108, 110, 112 may include those based on foaming or molding one or more polymers, such as one or more elastomers (e.g., thermoplastic elastomers (TPE)). The one or more polymers may include aliphatic polymers, aromatic polymers, or mixtures of both; and may include homopolymers, copolymers (including terpolymers), or mixtures of both.

In some aspects, the one or more polymers may include olefinic homopolymers, olefinic copolymers, or blends thereof. Examples of olefinic polymers include polyethylene, polypropylene, and combinations thereof In other aspects, the one or more polymers may include one or more ethylene copolymers, such as, ethylene-vinyl acetate (EVA) copolymers, EVOH copolymers, ethylene-ethyl acrylate copolymers, ethylene-unsaturated mono-fatty acid copolymers, and combinations thereof.

In further aspects, the one or more polymers may include one or more polyacrylates, such as polyacrylic acid, esters of polyacrylic acid, polyacrylonitrile, polyacrylic acetate, polymethyl acrylate, polyethyl acrylate, polybutyl acrylate, polymethyl methacrylate, and polyvinyl acetate; including derivatives thereof, copolymers thereof, and any combinations thereof.

In yet further aspects, the one or more polymers may include one or more ionomeric polymers. In these aspects, the ionomeric polymers may include polymers with carboxylic acid functional groups, sulfonic acid functional groups, salts thereof (e.g., sodium, magnesium, potassium, etc.), and/or anhydrides thereof. For instance, the ionomeric polymer(s) may include one or more fatty acid-modified ionomeric polymers, polystyrene sulfonate, ethylene-methacrylic acid copolymers, and combinations thereof.

In further aspects, the one or more polymers may include one or more styrenic block copolymers, such as acrylonitrile butadiene styrene block copolymers, styrene acrylonitrile block copolymers, styrene ethylene butylene styrene block copolymers, styrene ethylene butadiene styrene block copolymers, styrene ethylene propylene styrene block copolymers, styrene butadiene styrene block copolymers, and combinations thereof.

In further aspects, the one or more polymers may include one or more polyamide copolymers (e.g., polyamide-polyether copolymers) and/or one or more polyurethanes (e.g., cross-linked polyurethanes and/or thermoplastic polyurethanes). Alternatively, the one or more polymers may include one or more natural and/or synthetic rubbers, such as butadiene and isoprene.

When the resilient polymeric material is a foamed polymeric material, the foamed material may be foamed using a physical blowing agent which phase transitions to a gas based on a change in temperature and/or pressure, or a chemical blowing agent which forms a gas when heated above its activation temperature. For example, the chemical blowing agent may be an azo compound such as adodicarbonamide, sodium bicarbonate, and/or an isocyanate.

In some embodiments, the foamed polymeric material may be a crosslinked foamed material. In these embodiments, a peroxide-based crosslinking agent such as dicumyl peroxide may be used. Furthermore, the foamed polymeric material may include one or more fillers such as pigments, modified or natural clays, modified or unmodified synthetic clays, talc glass fiber, powdered glass, modified or natural silica, calcium carbonate, mica, paper, wood chips, and the like.

The resilient polymeric material may be formed using a molding process. In one example, when the resilient polymeric material is a molded elastomer, the uncured elastomer (e.g., rubber) may be mixed in a Banbury mixer with an optional filler and a curing package such as a sulfur-based or peroxide-based curing package, calendared, formed into shape, placed in a mold, and vulcanized.

In another example, when the resilient polymeric material is a foamed material, the material may be foamed during a molding process, such as an injection molding process. A thermoplastic polymeric material may be melted in the barrel of an injection molding system and combined with a physical or chemical blowing agent and optionally a cross-linking agent, and then injected into a mold under conditions which activate the blowing agent, forming a molded foam.

Optionally, when the resilient polymeric material is a foamed material, the foamed material may be a compression molded foam. Compression molding may be used to alter the physical properties (e.g., density, stiffness and/or durometer) of a foam, or to alter the physical appearance of the foam (e.g., to fuse two or more pieces of foam, to shape the foam, etc.), or both.

The compression molding process desirably starts by forming one or more foam preforms, such as by injection molding and foaming a polymeric material, by forming foamed particles or beads, by cutting foamed sheet stock, and the like. The compression molded foam may then be made by placing the one or more preforms formed of foamed polymeric material(s) in a compression mold, and applying sufficient pressure to the one or more preforms to compress the one or more preforms in a closed mold. Once the mold is closed, sufficient heat and/or pressure is applied to the one or more preforms in the closed mold for a sufficient duration of time to alter the preform(s) by forming a skin on the outer surface of the compression molded foam, fuse individual foam particles to each other, permanently increase the density of the foam(s), or any combination thereof. Following the heating and/or application of pressure, the mold is opened and the molded foam article is removed from the mold.

With continued reference to FIG. 2, the plate 114 extends from a first end 158 at the anterior end 18 of the sole structure 100 to a second end 160 at the posterior end 20 of the sole structure 100. The plate 114 includes a top surface 162, a bottom surface 164 formed on an opposite side of the plate 114 than the top surface 162, and a peripheral side surface 166 extending from the top surface 162 to the bottom surface 164 and defining a peripheral profile of the plate 114. A distance from the top surface 162 to the bottom surface 164 defines a thickness $T_{114}$ of the plate 114. In the illustrated example, the thickness $T_{114}$ of the plate 114 is substantially constant. The plate 114 is formed of one or more rigid or semi-rigid materials having a greater durometer than any of the cushioning elements 108, 110, 112. In some examples, the plate 114 is formed of an elastomeric material, such as a nylon. Additionally or alternatively, the plate 114 may include one or more composite materials.

As shown in FIG. 7, when the sole structure 100 is assembled, the plate 114 is disposed within the socket 144 of the interior cushioning arrangement 106 and is interposed between the interior cushioning arrangement 106 and the upper cushioning element 112. As shown, the thickness $T_{114}$ of the plate 114 is the same as a depth $D_{144}$ of the socket 144, such that the top surface 162 of the plate 114 is flush with the top surface 122 of the interior cushioning arrangement 106 when the sole structure is assembled. Accordingly, when the sole structure is assembled, the top surface 162 of the plate 114 and the top surface 122 of the interior cushioning arrangement 106 form a continuous surface upon which the bottom surface 154 of the upper cushioning element 112 rests.

With reference to FIG. 2, the plate 114 may include a necked portion 168 extending through the mid-foot region 14. The necked portion 168 is a portion of the plate 114 in the mid-foot region 14 having a reduced width $W_{114}$ relative to the adjacent portions of the plate 114 in the forefoot region 12 and the heel region 16. As shown in FIG. 2, the necked portion 168 is formed where a portion of the peripheral side surface 166 along the medial side 22 is inwardly offset towards the interior of the plate 114 (i.e., the longitudinal axis $A_{10}$) and forms a recess 170 along the medial side 22 of the plate 114. A longitudinal position of the necked portion 168 corresponds to the position of lateral arch of the foot, while a longitudinal position of the recess 170 corresponds to the position of the medial arch of the foot. In other words, the plate 114 is absent in a portion of the sole structure 100 corresponding to the medial arch of the foot. This configuration allows the plate 114 to provide support to the plantar surface of the foot along the lateral side 24, while maximizing flexibility of the sole structure through the mid-foot region 14.

With continued reference to FIG. 7, the plate 114 includes a compound curvature extending from the first end 158 to the second end 160, and may be described as including different portions 172a-172d each having a different curvature. Particularly, the plate 114 includes a toe portion 172a, a ball portion 172b, a mid-foot portion 172c, and a heel portion 172d, which are respectively disposed in the corresponding regions $12_T$, $12_B$, 14, 16. As shown, the toe portion 172a extends from the first end 158 of the plate 114 and is substantially straight. Each of the ball portion 172b and the heel portion 172d form concave portions of plate 114 where the top surface 162 has a concave curvature. The mid-foot portion 172c forms a portion of the plate 114 where the top surface 162 has a convex curvature. Accordingly, the top surface 162 of the plate 114 is cupped in the forefoot region 12 and the heel region 16, and forms an inverted (i.e., convex) transition region between the ball portion 172b and the heel portion 172d.

Referring still to FIG. 7, the ball portion 172b of the plate 114 is configured to support the metatarsophalangeal (MTP) joint of the foot. As shown, the ball portion 172b forms a concave potion of the top surface 162 having a radius $R_{172b}$ of curvature between the toe portion 172a and the mid-foot portion 172c. The ball portion 172b further includes a lower vertex 174 located at the lowermost point of the ball portion 172b. As shown in FIG. 7, the lower vertex 174 is positioned approximately 60% of the length $L_{114}$ of the plate from the second end 160 of the plate 114.

As provided above, each of the mid-foot portion 172c and the heel portion 172d are also curved to accommodate curvature of the plantar surface of the foot. For example, the mid-foot portion 172c of the plate 114 curves along a second radius of curvature $R_{172c}$ that is less than the first radius of curvature $R_{172b}$ of the ball portion 172b, and forms a convex portion of the top surface 162. The heel portion 172d of the plate 114 curves along a third radius curvature $R_{172d}$ that is less than the first radius of curvature $R_{172b}$ of the ball portion 172b, and forms a concave portion of the top surface 162.

With continued reference to FIG. 7, when the sole structure 100 is assembled, the midsole 102 has an overall thickness $T_{102}$ formed by the stacking of the interior cushioning arrangement 106 (e.g., $T_{108}$, $T_{110}$), the upper cushioning element 112 (e.g., $T_{112}$), and the plate 114 (e.g., $T_{114}$). The overall thickness $T_{102}$ is variable along the length of the midsole 102, whereby the thickness $T_{102}$ increases through the forefoot region 12 to the mid-foot region 14, and then decreases from the mid-foot region 14 to the heel region 16.

Here, a thickness of the interior cushioning arrangement 106 is substantially constant beneath the plate 114 from the anterior end 18 to the lower vertex 174, and then increases from the lower vertex 174 through the mid-foot region 14. Conversely, the upper cushioning element 112 increases in thickness $T_{112}$ from the anterior end 18 to the lower vertex 174, and then decreases through the mid-foot region to a substantially constant thickness $T_{112}$ in the heel region 16. As shown, this configuration results in the upper cushioning element 112 being thicker than the interior cushioning arrangement 106 in the forefoot region 12, and the interior cushioning arrangement 106 being thicker than the upper cushioning element 112 in the heel region 16. In other words, the plate 114 is located closer to the ground surface than to the plantar surface of the foot in the forefoot region 12, and is located closer to the plantar surface of the foot than to the ground surface in the heel region 16.

Figure 5:
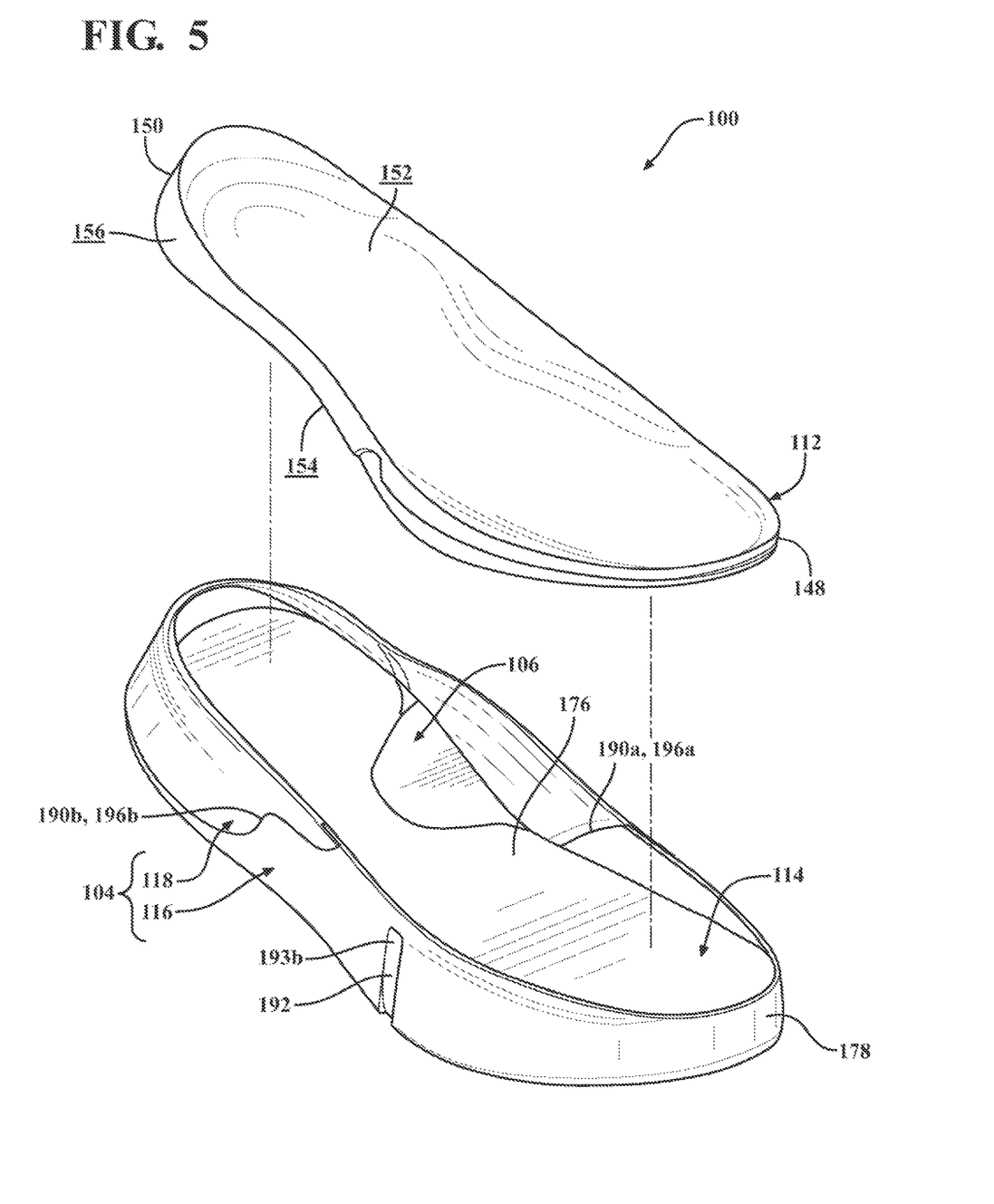
FIG. 5 is a partially exploded perspective view of a sole structure in accordance with the principles of the present disclosure, for use with the article of footwear of FIG. 1.
Figure 6:
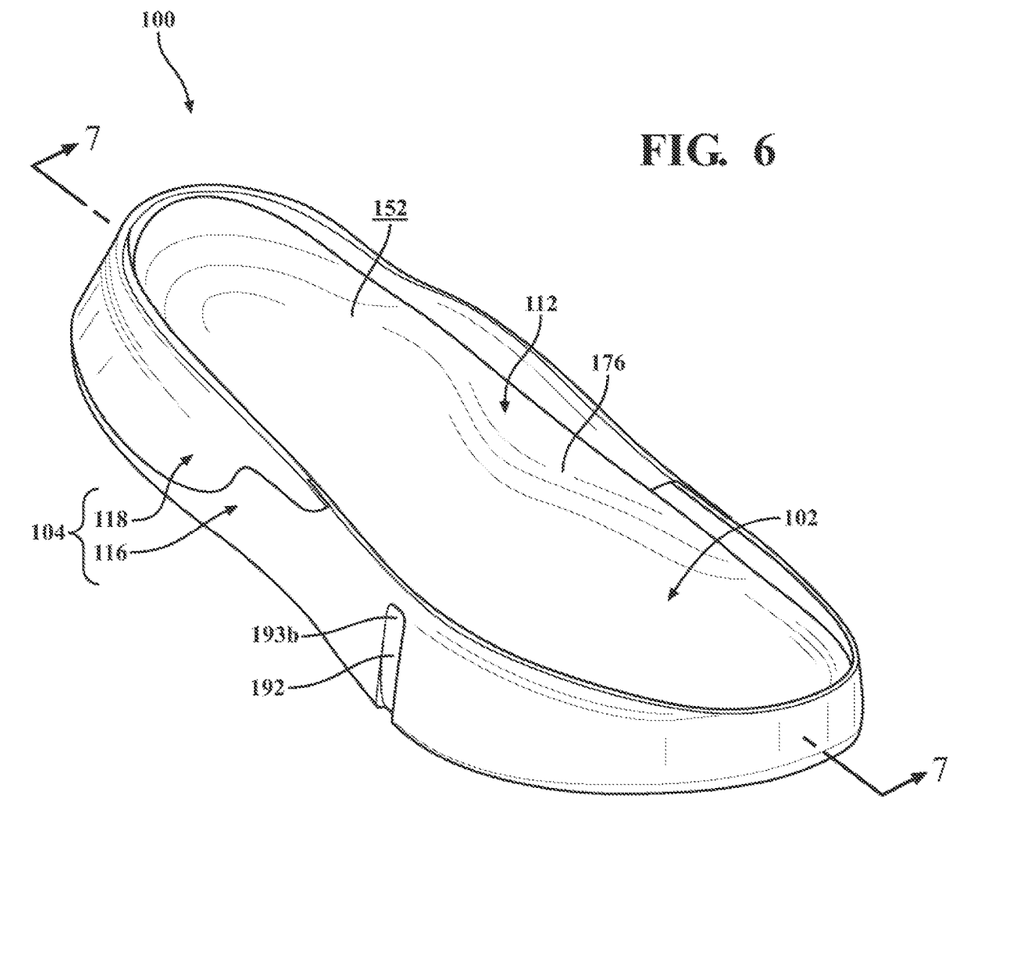
FIG. 6 is a perspective view of a sole structure in accordance with the principles of the present disclosure, for use with the article of footwear of FIG. 1.

As provided above, the outsole 104 may be constructed as a composite structure including the outer shell 116 and the heel counter 118. Generally, the outer shell 116 is configured to form the ground-engaging surface of the article of footwear 10, and is formed of one or more materials for imparting properties of cushioning, traction, and abrasion resistance. The heel counter 118 extends around the posterior end 20 of the article of footwear 10, and is configured to provide stability around the heel region 16. Accordingly, the heel counter 118 may be formed of a material having a greater hardness than the outer shell 116. As best shown in FIGS. 5 and 6, when the outsole 104 is assembled, the outer shell 116 and the heel counter 118 cooperate to define a cavity 176 for receiving the midsole 102.

Referring to FIGS. 2-4, the outer shell 116 of the outsole 104 extends from a first end 178 at the anterior end 18 of the article of footwear 10 to a second end 180 at the posterior end of the article of footwear 10. Accordingly, the outer shell 116 extends along the full length of the article of footwear 10. The outer shell 116 includes a ground-engaging element 182 extending continuously from the first end 178 to the second end 180, and a peripheral wall 184 extending from the ground-engaging element 182 along a perimeter of the outer shell 116.

As shown in FIGS. 2 and 3, the ground-engaging element 182 includes a top surface 186 and a bottom surface 188 formed on an opposite side of the ground-engaging element 182 than the top surface 186. Here, the bottom surface 188 of the ground-engaging element 182 forms a ground-engaging surface 188 of the article of footwear 10. A distance from the top surface 186 to the bottom surface 188 defines a thickness of the ground-engaging element 182.

The peripheral wall 184 extends substantially perpendicularly from the top surface 186 of the ground-engaging element 182 and bounds a first portion of the cavity 176 of the outsole 104. As shown, the peripheral wall 184 includes a first portion 184a extending around the first end 178 of the outer shell 116 and a second portion 184b extending around the second end 180 of the outer shell 116. As indicated in FIG. 2, the first portion 184a of the peripheral wall 184 has a first height $H_{184a}$ and the second portion 184b of the peripheral wall 184 has a second height $H_{184b}$. The first height $H_{184a}$ is greater than the second height $H_{184b}$ such that the first portion 184a protrudes beyond (i.e., above) the second portion 184b and includes a pair of terminal ends 190a, 190b configured to interface with the heel counter 118. In the illustrated example, the terminal ends 190a, 190b may be offset from each other, such that the terminal end 190a on the medial side 22 is closer to the anterior end 18 than the terminal end 190b on the lateral side 24. Accordingly, the first portion 184a of the peripheral wall 184 extends farther along the lateral side 24 than the medial side 22.

As shown in FIGS. 2 and 3, the outer shell 116 may include a channel 192 formed at least partially through a thickness of the outer shell 116. In the illustrated example, a length of the channel 192 extends from a first terminal end 193a on the medial side 22 of the ground-engaging element 182 to a second terminal end 193b in the peripheral wall on the lateral side 24 of the ground-engaging element 182. In the ground-engaging element 182, the channel 192 is formed across a width (i.e., transverse to the longitudinal axis $A_{10}$) of the bottom surface 188 in the ball portion $12_B$ and has an S-shaped curvature from the medial side 22 to the lateral side 24.

As discussed above, the outer shell 116 may further include a step 194 formed at the second end 180. The step 194 is configured to support the flange 146 formed at the second distal end 132 of the heel cushioning element 110. Accordingly, the step 194 may include a substantially planar, upward-facing surface extending around the second end 180. Here, a height of the step 194 increases along each of the medial and lateral sides 22, 24 to a maximum height at the second end 180.

In the illustrated example, the outer shell 116 is formed as a unitary body of a single elastomeric material, such as a natural or synthetic rubber material. The material of the outer shell 116 is selected to provide characteristics of cushioning, traction, and abrasion resistance to the outsole 104. In some examples, the ground-engaging element 182 and the peripheral wall 184 may be formed of different materials and then attached to each other.

The heel counter 118 is configured to interface with the peripheral wall 184 of the outer shell 116. As shown, the heel counter 118 is a U-shaped element that extends from a first terminal end 196a on the medial side 22 to a second terminal end 196b on the lateral side 24. Each of the first terminal end 196a and the second terminal end 196b are configured to interface with respective terminal ends 190a, 190b of the first portion 184a of the peripheral wall 184. For example, a profile of each of the terminal ends 196a, 196b of the heel counter 118 corresponds to profile of a respective one of the terminal ends 190a, 190b of the peripheral wall 184, such that when the heel counter 118 is assembled with the outer shell 116, the peripheral wall 184 and the heel counter 118 cooperate to continuously bound the cavity 176 of the outsole 104.

As set forth above, the sole structure 100 of the present disclosure advantageously provides zonal and layered cushioning in combination with a rigid support plate. Particularly, the sole structure includes zonal cushioning by providing an interior cushioning arrangement 106 having a first material in the forefoot and a softer second material in the heel. This configuration provides improved impact attenuation associated with a heel strike during walking. In addition to the zonal cushioning provided by the composite interior cushioning arrangement 106, the sole structure 100 includes layered cushioning by providing an upper cushioning element 112 in layered arrangement with the interior cushioning element 106. Thus, the interior cushioning arrangement 106, having first and second materials that are softer than the third material of the upper cushioning element 112, provides underfoot cushioning, while the upper cushioning element 112 provides a stabilizing interface between the plantar surface of the foot and the interior cushioning arrangement 106. Providing a full-length plate 114 between the interior cushioning arrangement 106 and the upper further increases stability within the sole structure 100, and may improve energy return while walking. Altogether, these features cooperate to provide a desirable configuration for articles of footwear associated with long periods of standing and walking.

The following Clauses provide an exemplary configuration for an article of footwear and sole structure described above.

Clause 1. A sole structure for an article of footwear, the sole structure comprising an interior cushioning arrangement extending from an anterior end to a posterior end and including (i) a forefoot cushioning element extending from the anterior end to a first end and including a first material having a first durometer, and (ii) a heel cushioning element extending from the posterior end to a second end and including a second material having a second durometer, the first end of the forefoot cushioning element and the second end of the heel cushioning element overlapping one another.

Clause 2. The sole structure of Clause 1, wherein the second durometer is less than the first durometer.

Clause 3. The sole structure of any of the preceding Clauses, wherein the interior cushioning arrangement includes a first surface having a first portion formed by the forefoot cushioning element and a second portion formed by the heel cushioning element.

Clause 4. The sole structure of Clause 3, further comprising a plate disposed adjacent to the first surface of the interior cushioning arrangement.

Clause 5. The sole structure of Clause 4, wherein the plate is disposed within a socket formed in the first surface of the interior cushioning arrangement.

Clause 6. The sole structure of Clause 4, further comprising an upper cushioning element disposed on an opposite side of the plate than the interior cushioning arrangement and including a third material having a third durometer.

Clause 7. The sole structure of Clause 6, wherein the third durometer is greater than the first durometer and the second durometer.

Clause 8. The sole structure of any of the preceding Clauses, further comprising an outer shell formed of a fourth material and defining a receptacle, the interior cushioning arrangement at least partially received within the receptacle.

Clause 9. The sole structure of any of the preceding Clauses, wherein the first material is a first foamed elastomer and the second material is a second foamed elastomer.

Clause 10. The sole structure of any of the preceding Clauses, wherein the first end includes a first beveled surface and the second end includes a second beveled surface, the first beveled surface mating with the second beveled surface.

Clause 11. A sole structure for an article of footwear, the sole structure comprising a forefoot cushioning element extending from a first distal end to a first proximal end and including a first material having a first durometer, the first proximal end including a first beveled engagement surface and a heel cushioning element extending from a second distal end to a second proximal end and including a second material having a second durometer, the second proximal end including a second beveled engagement surface opposing the first beveled engagement surface of the forefoot cushioning element.

Clause 12. The sole structure of Clause 11, wherein the second durometer is less than the first durometer.

Clause 13. The sole structure of any of the preceding Clauses, wherein the forefoot cushioning element and the heel cushioning element cooperate to form a first surface having a first portion formed by the forefoot cushioning element and a second portion formed by the heel cushioning element.

Clause 14. The sole structure of Clause 13, further comprising a plate disposed adjacent to the first surface.

Clause 15. The sole structure of Clause 14, wherein the plate is disposed within a socket formed in the first surface.

Clause 16. The sole structure of Clause 14, further comprising an upper cushioning element disposed on an opposite side of the plate than the forefoot cushioning element and the heel cushioning element, and including a third material having a third durometer.

Clause 17. The sole structure of Clause 16, wherein the third durometer is greater than the first durometer and the second durometer.

Clause 18. The sole structure of any of the preceding Clauses, further comprising an outer shell formed of a fourth material and defining a receptacle, the forefoot cushioning element and the heel cushioning element at least partially received within the receptacle.

Clause 19. The sole structure of any of the preceding Clauses, wherein the first material is a first foamed elastomer and the second material is a second foamed elastomer.

Clause 20. The sole structure of any of the preceding Clauses, wherein the first beveled engagement surface includes a first plurality of engagement features and the second beveled engagement surface includes a second plurality of engagement features configured to mate with the first plurality of engagement features.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

The invention claimed is:

1. A sole structure for an article of footwear, the sole structure comprising:
   an interior cushioning arrangement extending from an anterior end to a posterior end, the anterior end including a forward-most point of the sole structure and the posterior end including a rearward-most point of the sole structure, the interior cushioning arrangement including (i) a forefoot cushioning element, including a first surface, extending from the anterior end to a first end of the forefoot cushioning element and including a first material having a first durometer, and (ii) a heel cushioning element, including a first surface, extending from the posterior end to a second end of the heel cushioning element and including a second material having a second durometer, the first end of the forefoot cushioning element and the second end of the heel cushioning element in direct contact with one another such that there is no intervening element between the first end of the forefoot cushioning element and the second end of the heel cushioning element, wherein the first surface of the forefoot cushioning element and the first surface of the heel cushioning element form a continuous surface of the interior cushioning arrangement;
   an upper cushioning element, including a first surface and a second surface opposite the first surface, extending from the anterior end of the interior cushioning arrangement to the posterior end of the interior cushioning arrangement;

a plate, including a first surface, extending from the anterior end to the posterior end disposed on each of the first surface of the forefoot cushioning element and the first surface of the heel cushioning element; and wherein the plate includes a reduced width portion relative to adjacent portions of the plate, the reduced width portion forming a recess in the plate, wherein a portion of the continuous surface of the interior cushioning arrangement is exposed through the recess, wherein the second surface of the upper cushioning element is attached to each of the first surface of the plate and the portion of the interior cushioning arrangement exposed through the recess of the plate, and wherein the plate is exposed on an outermost peripheral side surface of the sole structure, on a lateral side of the sole structure, and on a medial side of the sole structure, an outsole including:

an outer shell extending from a first end at the anterior end to a second end at the posterior end, the outer shell including a ground-engaging element and a peripheral wall configured to extend from the ground-engaging element toward an upper of the article of footwear along a perimeter of the outer shell, the peripheral wall having a first terminal end on a lateral side of the sole structure and a second terminal end on a medial side of the sole structure; and a heel counter, wherein the heel counter includes a pair of terminal ends offset from one another, wherein each of the pair of terminal ends of the heel counter is configured to respectively interface with one of the first terminal end of the peripheral wall and the second terminal end of the peripheral wall of the outer shell of the sole structure.

2. The sole structure of claim 1, wherein the second durometer is less than the first durometer, and wherein the plate includes a third material having a third durometer greater than the second durometer and the first durometer.

3. The sole structure of claim 1, wherein the plate is disposed within a socket formed in the continuous surface of the interior cushioning arrangement.

4. The sole structure of claim 1, wherein the upper cushioning element includes a fourth material having a fourth durometer, wherein the fourth durometer is greater than the first durometer and the second durometer.

5. The sole structure of claim 1, wherein the outer shell is formed of a fifth material, and wherein the heel counter and the outer shell cooperate to define a receptacle, the interior cushioning arrangement at least partially received within the receptacle.

6. The sole structure of claim 1, wherein the first material is a first foamed elastomer and the second material is a second foamed elastomer.

7. The sole structure of claim 1, wherein the first end includes a first beveled surface and the second end includes a second beveled surface, the first beveled surface mating with the second beveled surface.

8. The sole structure of claim 3, wherein
the plate is disposed within the socket of the interior cushioning arrangement such that a top surface of the plate is flush with a top surface of the interior cushioning arrangement.

9. A sole structure for an article of footwear, the sole structure comprising:

an interior cushioning arrangement comprising:

a forefoot cushioning element continuously extending from a first distal end at an anterior end of the sole structure to a first proximal end at a mid-foot region of the sole structure and including a first material having a first durometer, the first proximal end including a first beveled engagement surface; and a heel cushioning element continuously extending from a second distal end at a posterior end of the sole structure to a second proximal end at the mid-foot region of the sole structure adjacent to the first proximal end and including a second material having a second durometer, the second proximal end including a second beveled engagement surface opposing the first beveled engagement surface of the forefoot cushioning element, wherein the interior cushioning arrangement has a first surface, the first surface including surfaces of the forefoot cushioning element and the heel cushioning element;

the first surface also including one or more raised areas; and the sole structure further including:

a plate, including a recess formed by a necked portion of the plate, disposed on the first surface of the interior cushioning arrangement such that a top surface of the plate is flush with a top surface of each of the one or more raised areas exposed through the recess, forming a continuous surface, wherein the plate is exposed adjacent to a peripheral side surface of the sole structure, and wherein the plate forms a portion of an outermost surface of the sole structure on a lateral side and a medial side of the sole structure;

an upper cushioning element disposed on the continuous surface; and an outsole including:

an outer shell extending from a first end at the anterior end to a second end at the posterior end, the outer shell including a ground-engaging element and a peripheral wall configured to extend from the ground-engaging element toward an upper of the article of footwear along a perimeter of the outer shell, the peripheral wall having a first terminal end on a lateral side of the sole structure and a second terminal end on a medial side of the sole structure; and a heel counter, wherein the heel counter includes a pair of terminal ends offset from one another, wherein each of the pair of terminal ends of the heel counter is configured to respectively interface with one of the first terminal end of the peripheral wall and the second terminal end of the peripheral wall of the outer shell of the sole structure.

10. The sole structure of claim 9, wherein the second durometer is less than the first durometer.

11. The sole structure of claim 9, wherein the upper cushioning element includes a third material having a third durometer, wherein the third durometer is greater than the first durometer and the second durometer.

12. The sole structure of claim 9, wherein the outer shell is formed of a fourth material, and wherein the heel counter and the outer shell cooperate to define a receptacle, the forefoot cushioning element and the heel cushioning element at least partially received within the receptacle.

13. The sole structure of claim 9, wherein the first material is a first foamed elastomer and the second material is a second foamed elastomer.

14. A sole structure for an article of footwear, the sole structure comprising:

an interior cushioning arrangement extending from an anterior end to a posterior end, the anterior end including a forward-most point of the sole structure and the posterior end including a rearward-most point of the sole structure, the interior cushioning arrangement including (i) a forefoot cushioning element extending from the anterior end to a first end of the forefoot cushioning element and (ii) a heel cushioning element extending from the posterior end to a second end of the heel cushioning element, the first end of the forefoot cushioning element and the second end of the heel cushioning element overlapping one another, wherein the interior cushioning arrangement includes a first surface having a first portion formed by the forefoot cushioning element and a second portion formed by the heel cushioning element;

a plate disposed on the first surface, the plate including a reduced width portion relative to adjacent portions of the plate, the reduced width portion forming a recess in the plate, wherein the reduced width portion extends through a mid-foot region of the sole structure corresponding to a medial arch of a foot of a user, and wherein a portion of the first surface is exposed through the recess;

an upper cushioning element attached to the plate and the portion of the first surface exposed through the recess; and an outsole including:
an outer shell extending from a first end at the anterior end to a second end at the posterior end, the outer shell including a ground-engaging element and a peripheral wall extending from the ground-engaging element toward an upper of the article of footwear along a perimeter of the outer shell, the peripheral wall having a first terminal end on a lateral side of the sole structure and a second terminal end on a medial side of the sole structure, wherein the outer shell comprises a first material having a first hardness; and
a heel counter comprising a second material having a second hardness different from the first hardness, the heel counter extending around the posterior end from the first terminal end of the outer shell to the second terminal end of the outer shell, the heel counter coupling with the outer shell forming a cavity, wherein the interior cushioning arrangement is at least partially received within the cavity, wherein the outer shell and the heel counter each form the outermost surface of the sole structure, and wherein the heel counter includes a pair of terminal ends offset from one another, wherein each of the pair of terminal ends of the heel counter is configured to respectively interface with one of the first terminal end and the second terminal end of the peripheral wall of the outer shell.

15. The sole structure of claim 14, wherein the outer shell includes a ground-engaging surface.

16. The sole structure of claim 15, wherein the peripheral wall extends upward from the ground-engaging surface.

17. The sole structure of claim 14, wherein the upper cushioning element forms a footbed of the sole structure.

* * * * *